(12) United States Patent
Strohm et al.

(10) Patent No.: US 6,827,851 B1
(45) Date of Patent: Dec. 7, 2004

(54) FILTER MODULE

(75) Inventors: Gerhard Strohm, Dexheim (DE); Georg Schnieder, Bad Kreuznach (DE)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/744,159

(22) PCT Filed: Jul. 15, 1999

(86) PCT No.: PCT/EP99/05011
§ 371 (c)(1),
(2), (4) Date: Jan. 22, 2001

(87) PCT Pub. No.: WO00/10684
PCT Pub. Date: Mar. 2, 2000

(30) Foreign Application Priority Data

Aug. 17, 1998 (DE) .......................... 198 37 257

(51) Int. Cl.[7] .......................... B01D 29/41; B01D 25/26
(52) U.S. Cl. .................. 210/228; 210/230; 210/231; 210/232; 210/330; 210/346; 210/486; 210/488; 210/492; 210/495
(58) Field of Search ............... 210/483, 488–489, 210/492, 495, 498, 224, 231, 228, 503, 506, 508, 502.1, 227, 230, 232, 323.1, 323.2, 340, 341, 346, 486, 490–491, 330–331

(56) References Cited

U.S. PATENT DOCUMENTS

| | | | | |
|---|---|---|---|---|
| 1,138,251 A | * | 5/1915 | Schaefer ..................... 210/228 |
| 1,197,403 A | * | 9/1916 | Seavey ..................... 210/502.1 |
| 1,446,187 A | | 2/1923 | Kessler |
| 2,079,365 A | | 5/1937 | Thomas |
| 2,088,199 A | * | 7/1937 | Gleason ..................... 210/347 |
| 2,631,732 A | * | 3/1953 | Vocelk ..................... 210/440 |
| 3,241,678 A | * | 3/1966 | Wrotnowski ............... 210/226 |
| 3,294,241 A | | 12/1966 | Sicard |
| 3,333,702 A | * | 8/1967 | Müller ..................... 210/230 |
| 3,347,384 A | * | 10/1967 | Muller ..................... 210/225 |
| 3,561,602 A | * | 2/1971 | Molitor ..................... 210/266 |
| 3,624,778 A | * | 11/1971 | Weber ..................... 210/230 |
| 3,647,084 A | | 3/1972 | Martin ..................... 210/492 |
| 3,666,107 A | * | 5/1972 | Boggs et al. ............... 210/238 |
| 4,016,080 A | * | 4/1977 | Williams ................... 210/284 |
| 4,347,208 A | * | 8/1982 | Southall ................... 210/331 |
| 4,664,812 A | * | 5/1987 | Klein ..................... 210/679 |
| 4,793,928 A | * | 12/1988 | Tsukamoto et al. ......... 210/344 |
| 4,871,456 A | * | 10/1989 | Naruo et al. ........... 210/321.84 |
| 4,876,007 A | * | 10/1989 | Naruo et al. ............... 210/339 |
| 5,112,503 A | * | 5/1992 | Raifman ................... 210/232 |
| 5,449,458 A | * | 9/1995 | Gneuss ..................... 210/330 |
| 5,538,634 A | * | 7/1996 | Pfiffner et al. ......... 210/500.26 |
| 5,607,581 A | * | 3/1997 | Gerner et al. ............... 210/188 |
| 2002/0060184 A1 | * | 5/2002 | Pulek et al. ................. 210/488 |
| 2002/0134732 A1 | * | 9/2002 | Wiseburgh et al. ......... 210/739 |

FOREIGN PATENT DOCUMENTS

| | | | |
|---|---|---|---|
| DE | 944 065 | 5/1956 | |
| DE | 32 39 687 | 5/1984 | |
| DE | 37 41 552 | 6/1989 | |
| DE | 42 14 694 A1 | 11/1993 | ........... B01D/27/14 |
| EP | 0 028 531 B1 | 2/1984 | ............ A61C/1/07 |
| EP | 0 233 999 A2 | 9/1987 | ........... B01D/29/34 |
| EP | 0 291 883 | 11/1988 | |
| EP | 0 327 394 B1 | 12/1995 | ........... B01D/25/26 |
| WO | WO-9835741 | * 8/1998 | |
| WO | WO 98 35741 | 8/1998 | |

\* cited by examiner

*Primary Examiner*—Terry K. Cecil
(74) *Attorney, Agent, or Firm*—Leydig, Voit & Mayer, Ltd.

(57) ABSTRACT

The invention relates to a filter module (4) with a simplified design which allows for the manufacturing of a step filter, Each ply of filter medium is composed of a deep-bed filter material layer (1, 1a–d) and the packing is composed of draining layers (5, 5a, 5b). The draining layers (5, 5a, 5b) and filter layers (5, 5a, 5b) are mutually sealed to the filtrate/non-filtrate chamber (2,3). The filter layers (1, 1a–d) can be arranged according to any pattern.

24 Claims, 6 Drawing Sheets

FILTER MODULE

Figure 1:
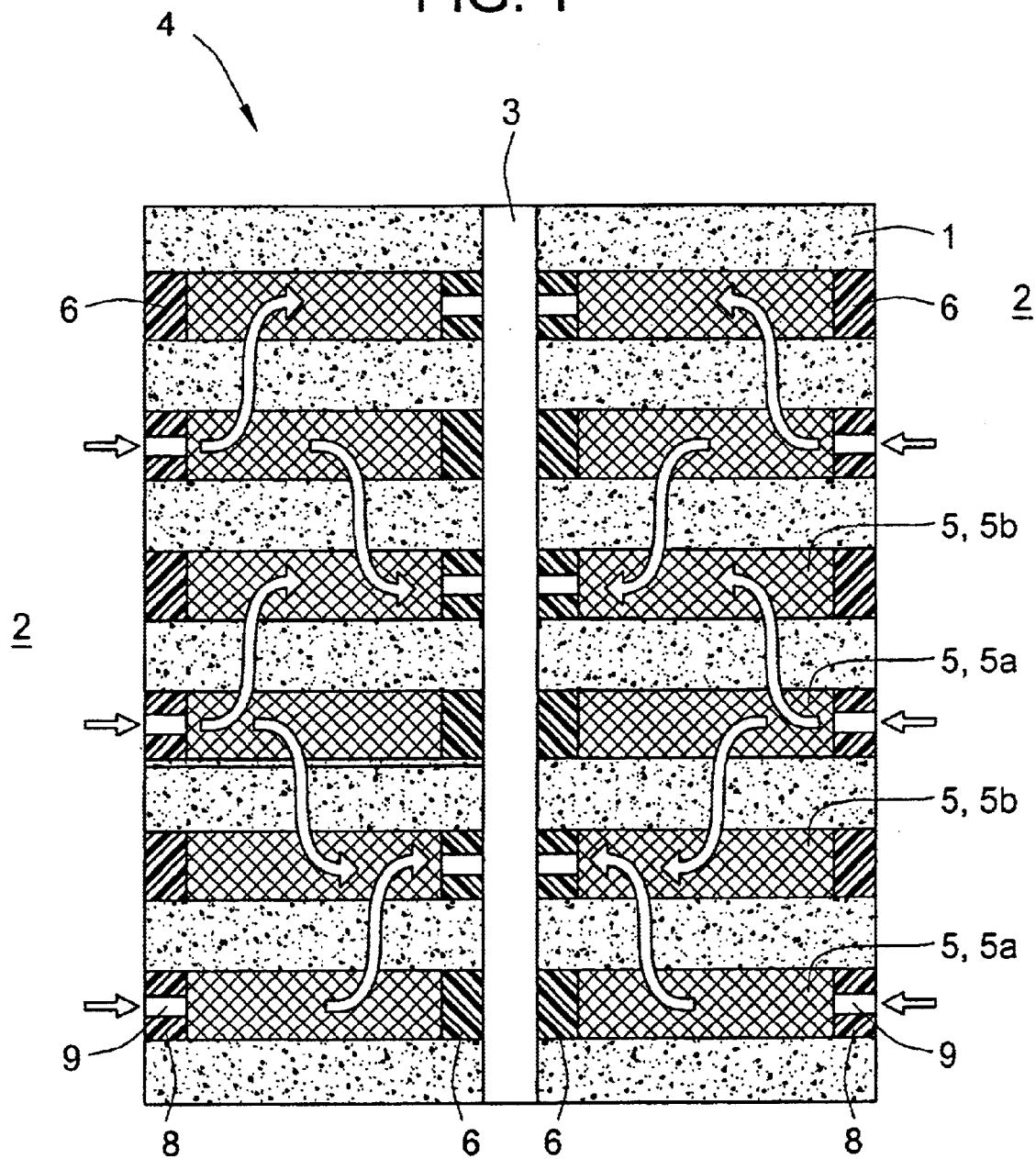

This application is the national phase of international application PCT/EP99/05011 filed Jul. 15, 1999.

The invention relates to a filter module with layers of a filter medium, between which there are draining spacer elements, the spacer elements which guide the unfiltered material being sealed relative to the filtrate space.

These filter modules are known in diverse forms, its being common to most of these filter modules that the filter layers are made of flat material, therefore filter cardboard, papers, nonwovens or fabrics.

U.S. Pat. No. 4,347,208 discloses a filter module of filter cells with a core consisting of a plastic draining spacer (inner spacer) on which rests on both sides a filter layer of the filter medium in the form of flat disks. In the center of the filter cell is a filtrate opening. These filter cells must be extrusion coated with a plastic material for sealing on the outer edge. This is complex and expensive because special forms which must be adapted to the geometry of the filter cell must be used for this purpose. The filter cell is sealed relative to the space for the unfiltered material by pressing together the two filter material layers which lie on top of one another in the edge area and by forming a U-shaped plastic element which reaches around the edge area.

Similar filter modules are known from EP 0 285 31 B1, U.S. Pat. Nos. 2,088,199, 3,666,107, 5,607,581 and EP 0 327 394 A2, preferably in addition support tubes being used on which the filter cells are located and held.

EP 0 233 999 likewise discloses one such filter module in which between the filter cells there are in addition so-called outer spacers which keep the filter cells at a distance in order to prevent damage, collapse or swelling of the filter cells. In addition, the radial flow between the filter cells will be improved. The inner and outer spaces are shaped differently so that different tools are needed for production. Extrusion coated filter cells are used in this filter module as well.

Step filters cannot be produced with these known filter arrangements.

The object of the invention is to simplify the filter module known from EP 0 233 999 with respect to structure, and the production of a step filter will also be possible.

This object is achieved with a filter module in which each layer of filter medium consists of a layer of deep bed filter material, the spacer elements consist of draining layers and the draining layers and the filter layers are stacked on top of one another without a gap, the draining layers being sealed on alternating sides to the filtrate/unfiltered material space.

Use of layers both for spacer elements and also for the filter layers offers the possibility of stacking all layers on top of one another without for example supporting tubes being necessary, as is the case in filter cells. In addition, it is possible to stack any filter layers in any sequence.

One major advantage is that it is not necessary to extrusion coat two or more layers by complex processes. The layers are simply stacked on top of one another with their seals, and immediately or later before use are compressed for the ready-to-work state.

The deep bed material has organic and/or inorganic fibrous and/or grainy materials. As the base material for the filter layers celluloses or plastic fibers are used, into which for example kieselguhr, perlites or metal oxides or other filtration-active substances can be introduced. Here the kieselguhrs and perlites are used to enlarge the inner surface and thus to increase the sediment absorption capacity.

The filter layers and the draining filter layers are preferably planar.

Preferably at least two filter layers with different degrees of separation are placed on top of one another, by which thus a step filter can be easily produced. The last filter layer of this filter layer arrangement can be made for example as a disinfection layer.

It is also possible to place at least two filter layers with the same degree of separation on top of one another. This is advantageous especially when they are adsorptively acting filter layers, because then the passage length for the unfiltered material can be increased at will so that the adsorptive action of the filter material can develop better.

According to another embodiment, variously adsorptively acting materials can be worked into the filter layers. This means that different materials can be present in different filter layers or that these different materials can also be combined in one filter layer. These filter layers can also be combined with filter layers which are free of adsorptively acting materials.

Sealing of the draining layers to the filtrate or the unfiltered material is done preferably by suitable sealing elements. These sealing elements which can be provided individually for each layer preferably have the same thickness as the corresponding draining layer.

The filter layers must also preferably have the corresponding sealing elements which point to the filtrate space, in an arrangement of filter layers with different permeability and/or degree of separation the tightest layer, i.e. the layer with the highest degree of separation or the lowest permeability, need not necessarily have a sealing element.

Preferably the sealing elements consist of moldings, for example plastic frames, which are inserted together with the layers to form the filter module.

Depending on the embodiment of the filter module, i.e. the arrangement of filter layers and draining layers, several sealing elements can also be stacked on top of one another when they are joined leakproof to one another. Preferably several adjoining sealing elements can be made in one part; this further simplifies production.

Preferably the sealing elements on their end faces have additional structures which can fit into the adjacent layer in order to increase the contact pressure in particular. These structures can be projections, rings, knobs or the like.

The material for the draining layer can be for example a plastic nonwoven. These materials would be strongly compressed in the structure as claimed in the invention if besides the sealing elements there were not other flow elements on the respectively other passage to the filtrate space or space for the unfiltered material which prevent the draining material from being compressed. For this reason, those flow elements are advantageous which consist of a massive frame which has holes, grooves or other flow openings which are located in the plane of the draining layer.

Preferably the draining layer is made integral with the sealing element and/or flow element. It thus becomes possible to produce cost-favorable components which simply need to be combined and joined with the filter layers.

Preferably the sealing elements and/or flow elements are provided with means for mutual connection. The connection means are also made to be easily detachable so that the module components can be easily separated from one another.

These connection means can comprise clips and catch projections.

The filter module as claimed in the invention offers the advantage that the layers can have any geometries. Round or rectangular layers are preferred.

The layers or the module can have several filtrate/unfiltered material channels which need not be arranged centered.

The production costs of the module as claimed in the invention are much lower than in those modules which are composed of filter cells. Disposal can also be clearly improved. The draining layers need simply be separated from the filter layers. When the layers are connected to one another via clips, for example, these clips need simply be separated and the entire module breaks down into its individual layers. The plastic parts and the filter layers can each be disposed of separately. In contrast to filter cells, which would have to be tediously separated first to dispose of the individual components, major simplification is achieved in the module as claimed in the invention.

Other advantages consist in that the filter modules can be operated in both flow directions, i.e. the filtrate space and space for the unfiltered material can be interchanged. In addition, the filter modules can be backflushed.

Sample embodiments of the invention are explained below using the drawings.

Figure 2A:
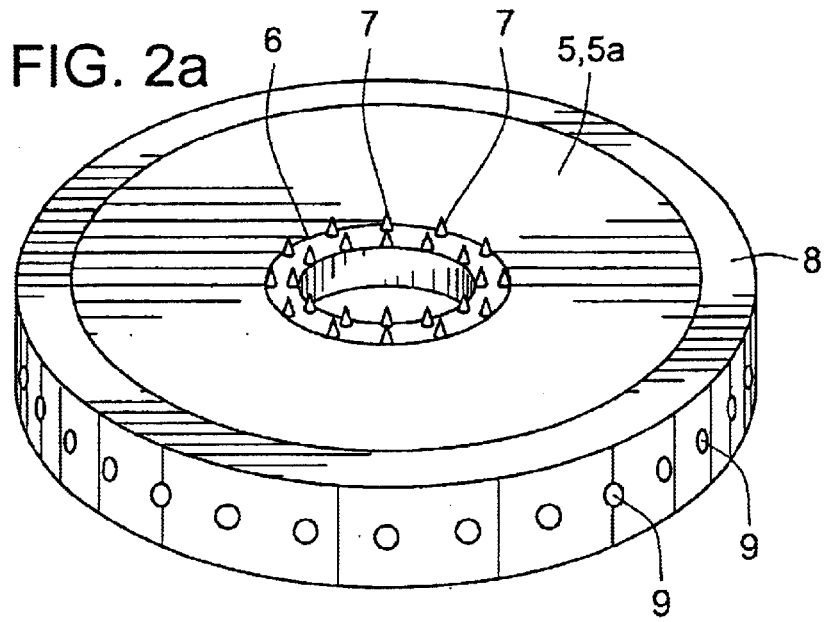
Figure 2B:
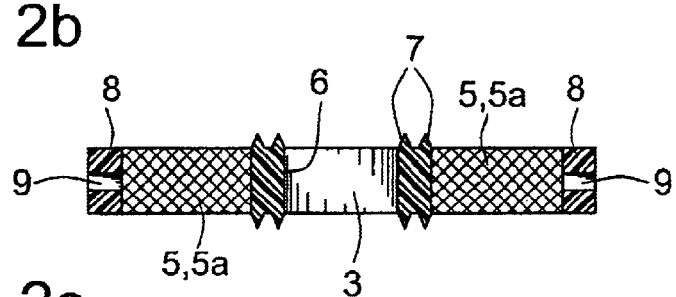
Figure 2C:
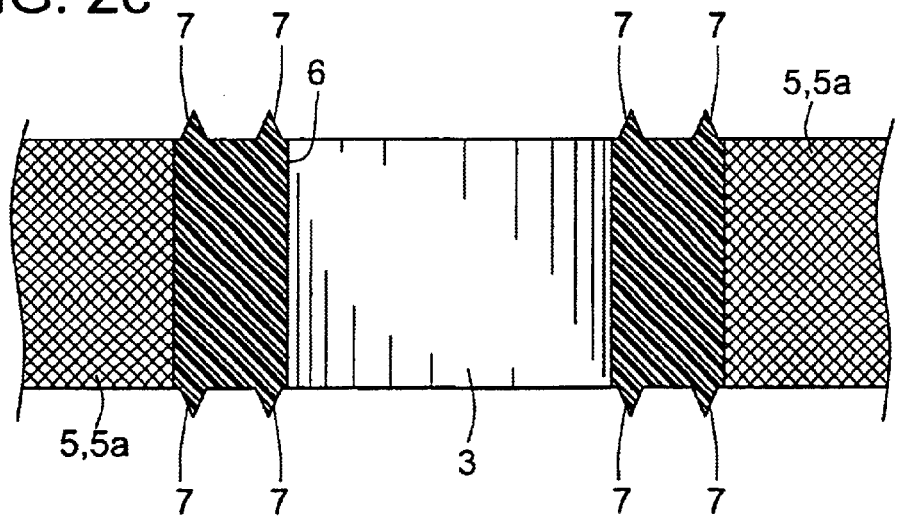
Figure 3:
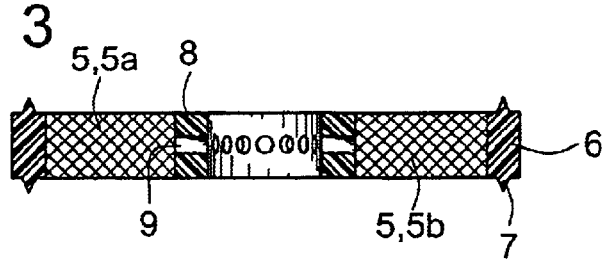
Figure 4:
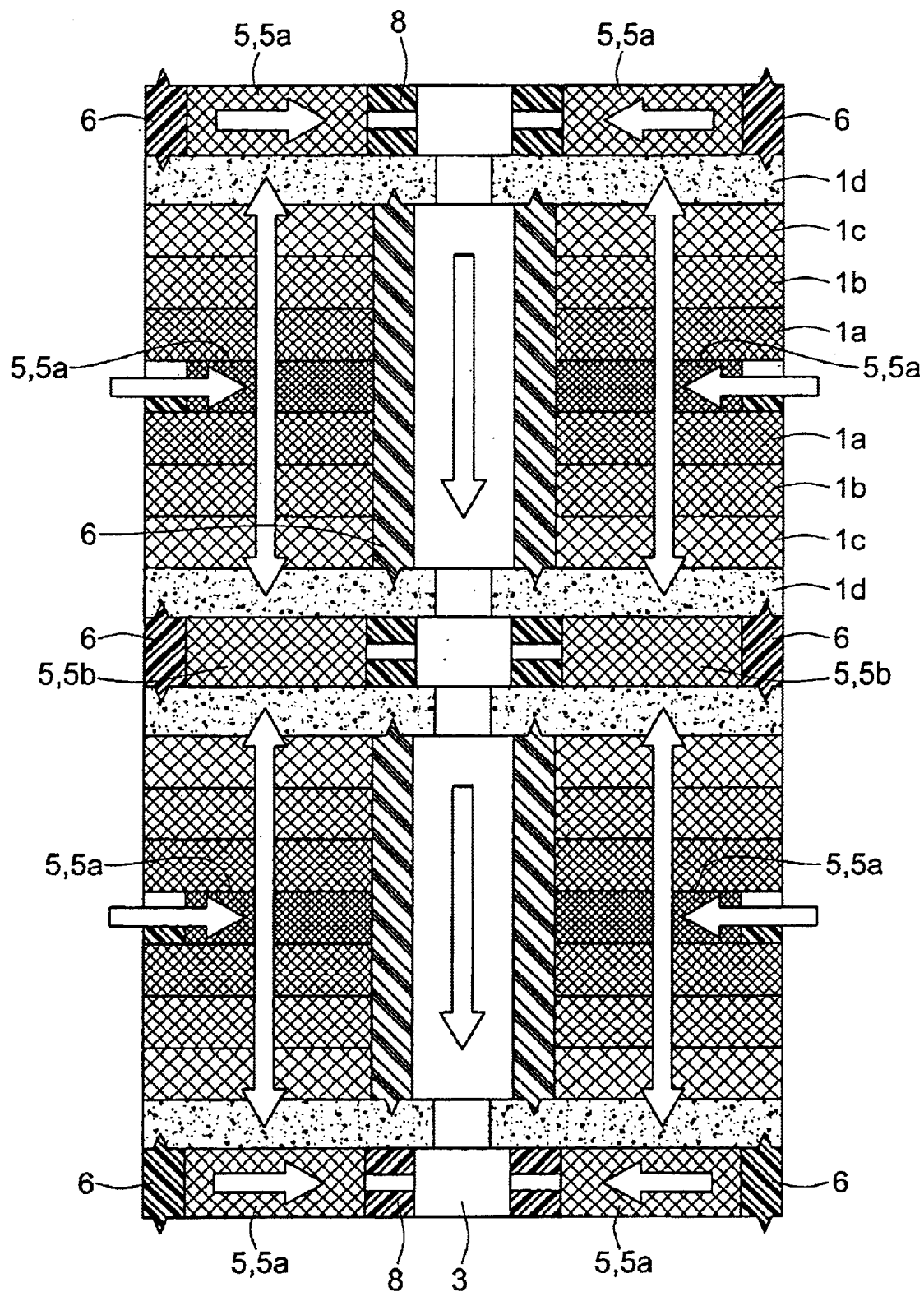
Figure 5A:
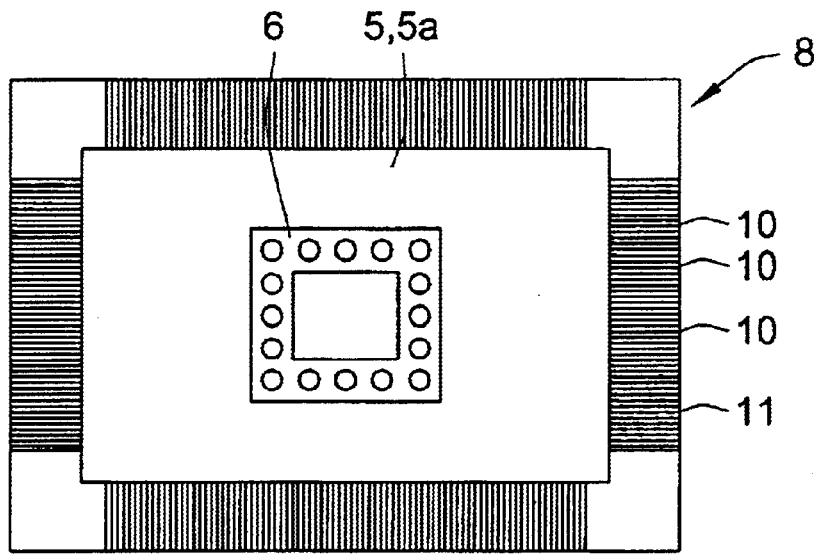
Figure 5B:
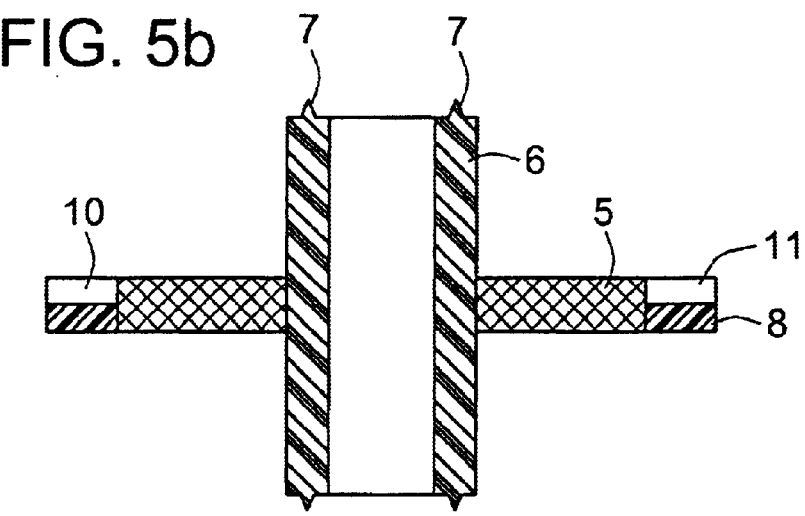
Figure 5C:
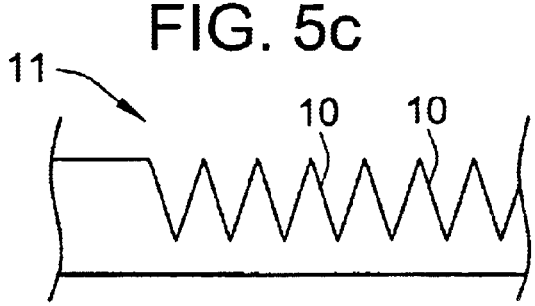
Figure 6:
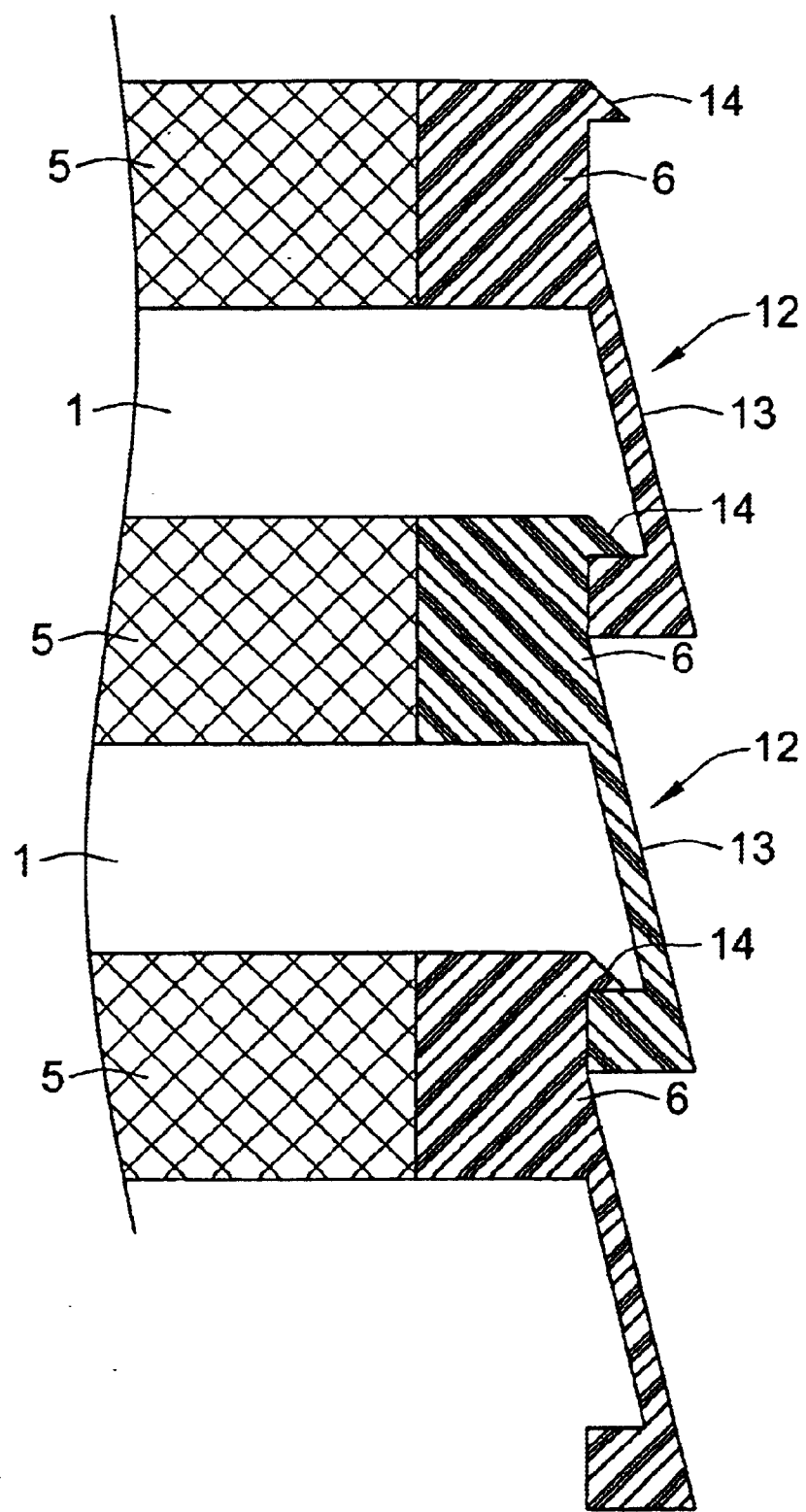
Figure 7:
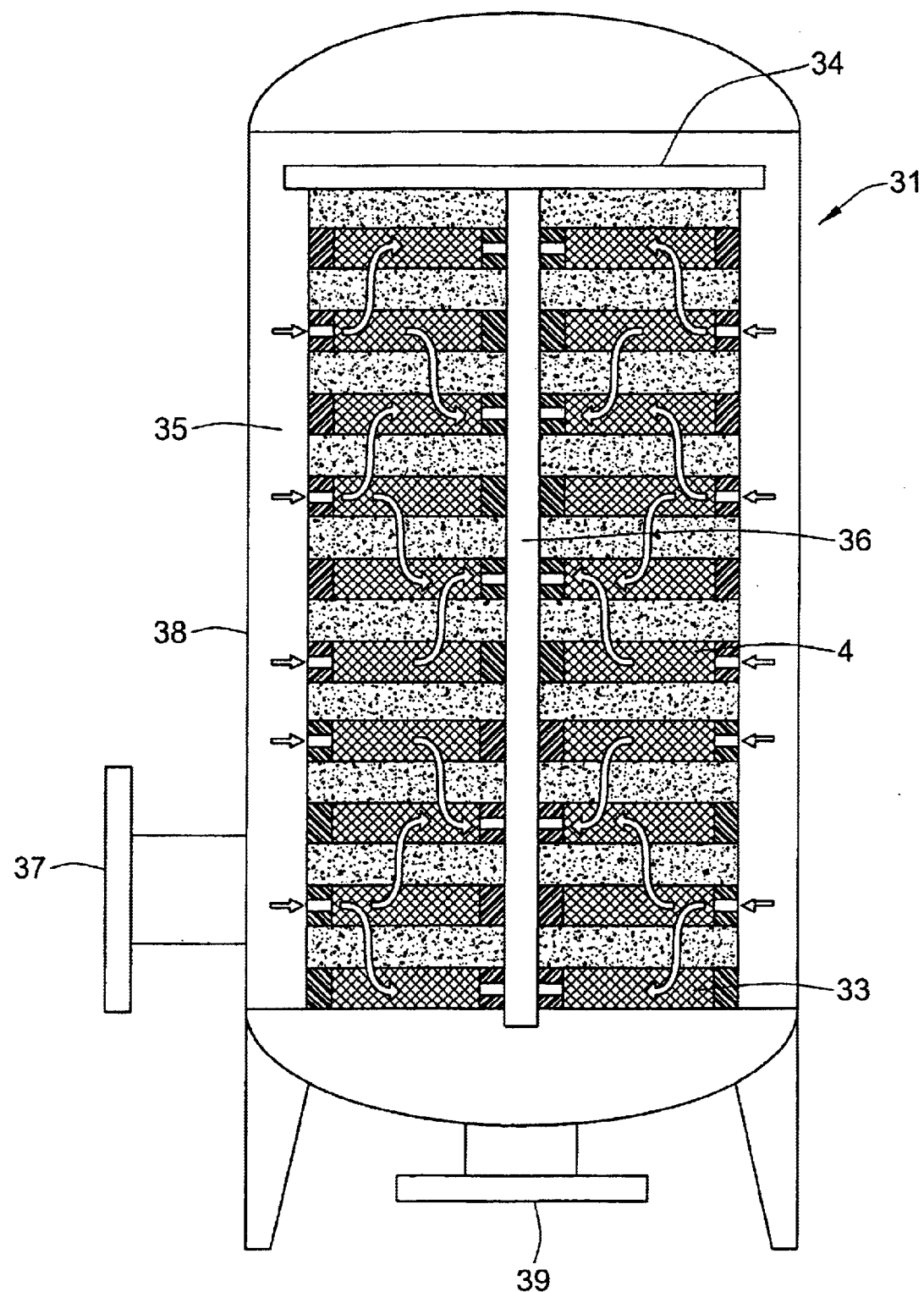

FIG. 1 shows a vertical section through a filter module,

FIGS. 2a–c show detailed views of a draining layer,

FIG. 3 shows a section through a draining layer according to another embodiment, FIG. 4 shows a vertical section through a filter module according to another embodiment, FIGS. 5a and 5b show an overhead view and a section through a draining layer according to another embodiment, FIG. 5c shows a section through a corrugated plate, FIG. 6 shows a partial section through a filter module for illustration of the connecting means, FIG. 7 shows a filter device with a filter module.

FIG. 1 shows a vertical section through a filter module 4. The filter module include filter regions formed of individual filter layers 1 which alternate with draining layers 5. For the geometry of the filter layers 1 and the draining layers 5 for example a round shape can be chosen, as proceeds from FIGS. 2a–c. The filter module 4 is surrounded by the space 2 for the unfiltered material and in the center has a filtrate space 3 in the form of a channel. Accordingly both the filter layers 1 and also the draining layers 5 have a central hole. The flow direction of the filtrate and the unfiltered material is indicated by arrow.

In the embodiment shown in FIG. 1 one filter layer 1 at a time alternates with one draining layer 5. The draining layers 5 are divided into layers 5a which carry the unfiltered material and layers 5b which carry the filtrate. The layer which carries the unfiltered material is sealed to the filtrate space 3 by a sealing element 6. As a result of the geometry here the sealing elements 6 are annular. In the draining layers 5b which carry the filtrate the passage to the filtrate space 3 is open. These layers are likewise sealed relative to the space 2 for the unfiltered material by the corresponding sealing elements 6. Each draining layer thus has its own sealing element which has the same thickness as the layer.

On the opposite transition to the filtrate space or the space for the unfiltered material the draining layers 5a, 5b each have a flow element 8 which has the same thickness as the layer and have flow openings 9. The filter module 4 which as described in conjunction with FIG. 7 is compressed, retains its shape due to the flow and sealing elements, and the draining layers 5a, 5b can perform their tasks.

In FIG. 2a the draining layer 5, 5a is shown in perspective. FIG. 2b shows a section through one such layer, in which the flow elements 8 which form the edge area can be seen more clearly. It is a flow ring consisting of a massive plastic material which is provided in the plane of the draining layer 5, 5a with through holes 9. This flow ring 8 together with the sealing elements 6 which likewise consist of massive material prevents the draining layer 5 from being compressed in the assembly and operation of the filter module. It must be ensured that the draining layer passes the unfiltered material unhindered and routes it to the filter material, i.e. to the bordering filter layers.

FIG. 2c shows the middle part of the draining layer 5, 5a enlarged so that on the end faces of the sealing element 6 the structures can be clearly seen in the form of sharp projections 7.

The draining layer 5a, the sealing element 6 and the flow element 8 can be individual components. But it is advantageous if the draining layer 5a, the sealing element 6 and the flow element 8 consist of one part because in this way the production costs can be greatly reduced.

FIG. 3 shows a section through a draining element 5b which carries the filtrate. In contrast to the draining layer shown in FIG. 2b the arrangement of the sealing element 6 and the flow element 8 is interchanged FIG. 4 shows another embodiment of the filter module 4. Between the draining layers 5a, 5b there are filter regions which include several filter layers 1a–1d. These filter layers 1a–1d have a degree of separation which rises when viewed in the flow direction, and for example the layer 1d can be a disinfection layer. The disinfection layer 1d is located directly in front of the draining layer 5b for the filtrate and has an especially high degree of separation. In this way the unfiltered material is filtered in stages and thus ensures an especially high service life of the filter module. The filter layers 1a–1c in this embodiment, like the draining layer 5a which carries the unfiltered material, has sealing elements 6 toward the filter space 3. Since the sealing elements 6 of these layers adjoin one another, a one-piece element in the form of a sealing tube can be used. Since the disinfection layer 1d is that layer with the highest degree of separation, the unfiltered material flowing directly to the filtrate space 3 is adequately cleaned and therefore does not require a sealing element.

FIG. 5a shows a draining layer 5 in an overhead view and FIG. 5b shows a draining layer in a section. The geometry here is rectangular. The sealing element 6 is a rectangular tube which extends up and down over the draining layer 5 to seal the overlying and underlying filter layers (which are not shown in FIG. 5b). The flow element 8 consists of a massive plastic ring with a corrugated plate 9 integrated on its top; this plate has grooves 10 which run in the plane of the draining layer 5. Instead or in addition, the flow element can have on the bottom a corrugated plate. FIG. 5c shows a detail of the corrugated plate 11.

FIG. 6 shows an extract from the filter module in which the sealing elements 6 each have one connection means 12 which consists of a clip 13 and a corresponding catch projection 14. The catch projections 14 are molded on the radial outer side of the sealing elements 6 in the same way as the clips 13. When the layers 1 and 5 are stacked on top of one another, the clips can catch on the catch projection and thus fix the entire module.

FIG. 7 illustrates the filter means 31 into which a filter module 4 is inserted. The filter module 4 stands on a bottom fixed end plate 33. In order to compensate for length changes of the filter module 4 in operation, the top end plate 34 is movably supported. In this case, outside or above the filter module 32 there is the space 35 for the unfiltered material. The filtrate space 36 is located inside or outside of the filter module 4. The unfiltered material passes through a connecting piece 37 in one side wall 38 of the container jacket into the filter means 31. The filtrate leaves the filtrate space 36 through a connecting piece 39 which is located centrally on the bottom of the filter means 31.

Reference Numbers 1 filter layer
1a–d filter layer
2 space for the unfiltered material 3 filtrate space
4 filter module
5 draining layer
5a draining layer which carries the unfiltered material
5b draining layer which carries the filtrate
6 sealing element
7 fixing means
8 flow element
9 hole
10 groove
11 corrugated plate
12 connecting means
13 clips
14 catch projection
31 filter means
33, 34 end plate
35 space for the unfiltered material
36 filtrate space
37 connecting piece
38 side wall
39 connecting piece

What is claimed is:

1. A filter module which defines filtered and unfiltered material spaces, said filter module comprising a separable stack of individual self-contained filter module elements, wherein said filter module elements include:
    an individual self-contained filter region formed of deep bed filter material, and
    individual self-contained first and second types of draining layers which include a draining layer material disposed between adjacent ones of said filter regions, wherein
        (i) said a first type of said draining layers includes a sealing element disposed at a side thereof adjacent said unfiltered material space, and flow passages disposed at an opposite side thereof adjacent said filtered material space, and
        (ii) said a second type of said draining layers includes said sealing element disposed at a side thereof adjacent said filtered material space, and includes said flow passages disposed at an opposite side thereof adjacent said unfiltered material space, wherein
    said individual self-contained filter module elements are arranged in said separable stack in a predetermined order in contact with adjacent other ones of said filter module elements without gaps, such that said first and second types of draining layers alternate relative to one another in said stack so that said sealing elements thereof alternately seal the draining layers from said filtered and unfiltered material spaces, and said flow passages thereof alternately establish flow paths between said draining layers and said filtered and unfiltered material spaces, respectively, and wherein
    at least one of said draining layers includes clips on an outer side thereof, and wherein at least another of said draining layers includes catch projections formed on an outer side thereof and engageable with said clips.

2. Filter module as claimed in claim 1, wherein said first and second types of draining layers include flow elements for directing flow of material therethrough, and wherein said flow passages include openings formed through a portion of said flow elements.

3. Filter module as claimed in claim 1, wherein said first and second types of draining layers include flow elements for directing flow of material therethrough, and wherein said flow passages include grooves formed in a portion of said flow elements.

4. Filter module as claimed in claim 2 or 3, wherein at least one of said sealing elements and flow elements include connectors for establishing mutual connection between the filter region and an adjacent one of the first and/or second types of draining layers in the stack.

5. Filter module as claimed in claim 2 or 3, wherein said sealing and flow elements are formed as an integral self-contained structure with said draining layer material in a leakproof manner.

6. Filter module as claimed in claim 2 or 3, wherein the draining layer material is integral with the sealing and flow elements thereof.

7. Filter module as claimed in claim 2 or 3, wherein said sealing elements include interconnected projections and clips.

8. Filter module as claimed in claim 1, wherein said one and another of said draining layers are adjacent in said separable stack.

9. Filter module as claimed in claim 1, wherein said sealing and flow elements are joined with and sealed to said draining layer material in a leakproof manner.

10. Filter module as claimed in claim 1, wherein said filter region includes first and second filter layers having respective different degrees of separation disposed one on top of another.

11. Filter module as claimed in claim 1, wherein said filter region includes first and second filter layers having the same degree of separation disposed one on top of another.

12. Filter module as claimed in claim 1, wherein the filter region is formed of an absorptive filter material.

13. Filter module as claimed in claim 1, wherein the filter region includes filter materials having different absorption properties.

14. Filter module as claimed in claim 1, wherein at least one of said sealing elements and flow elements include connectors for establishing mutual connection between the filter regions and the draining layers in the stack.

15. Filter module as claimed in claim 14, wherein the connectors protrude from said sealing elements into an adjacent said filter region.

16. Filter module as claimed in claim 1, wherein the draining layer material includes a plastic nonwoven material.

17. Filter module as claimed in claim 1, wherein said filter region includes at least one planar filter layer.

18. Filter module as claimed in claim 17, wherein each of said first and second types of draining layers is a planar structure.

19. Filter module as claimed in claim 18, wherein flow passages include holes oriented substantially parallel to the plane of the first and second types of draining layers.

20. Filter module as in claim 18, wherein the flow passages include grooves oriented substantially parallel to the plane of the first and second types of draining layers.

21. Filter module as claimed in claim 1, wherein said filter region comprises a plurality of individual planar filter layers.

22. Filter module as claimed in claim 21, wherein at least some of the filter layers are formed of a filter material having the same filtration properties.

23. Filter module as claimed in claim 21, wherein all of the filter layers are formed of a filter material having the same filtration properties.

24. Filter module as claimed in claim 21, wherein at least some of the filter layers have different filtration properties as compared to others of said filter layers.

* * * * *